United States Patent Office.

JOHN LAWRENCE KLEIN, OF NEW YORK, N. Y.

Letters Patent No. 79,358, dated June 30, 1868.

---

IMPROVEMENT IN MAKING SOAP.

---

*The Schedule referred to in these Letters Patent and making part of the same.*

---

TO ALL WHOM IT MAY CONCERN:

Be it known that I, JOHN LAWRENCE KLEIN, of the city of New York, State of New York, have invented a new and improved Mode of Making Soap; and I do hereby declare that the following is a full and exact description thereof.

The nature of my invention is as follows:

To make this soap, and to enable others skilled in the art to make and use my invention, I will now proceed to describe the different processes or compositions of matter used in its manufacture.

I use three different lyes, numbered, respectively, one, two, and three, their strength being measured, in all the different processes, by Baumé's hydrometer, and which can, by addition of water, be reduced to any strength required.

Lye No. 1. I take two thousand pounds (2,000 lbs.) of barilla, mix with it one thousand two hundred pounds (1,200 lbs.) unslaked lime, place the whole into a tank, and pour cold water upon it, until the water stands six or eight inches above the mixture. Stir it well, and let it rest until clear. When so, this lye will be of a strength of about twenty (20) or twenty-five (25) degrees, and is ready to be used.

Lye No. 2. I place into an iron kettle, heated upon open fire, or by dry or wet steam, six hundred pounds (600 lbs.) of caustic soda. Add to it one hundred gallons (100 gals.) of cold water. Let this mixture boil until the caustic soda is dissolved. When so, this lye will be of a strength of thirty-five (35) to forty (40) degrees, and ready to be used.

Lye No. 3. I place into an iron kettle, heated as in Lye No. 2, one thousand (1,000) pounds of salt soda. Add to it one hundred and fifty (150) gallons of cold water. Let it boil until the soda is dissolved. When so, I add three hundred (300) pounds of unslaked lime. Let it again boil until the lime is dissolved. When so, I place all of it into a tank. Let it settle until clear. When clear, this lye will be of a strength of about twenty-five (25) to thirty (30) degrees, and ready to be used.

This finishes the processes of making the three different kinds of lyes, which can now, by addition of water, be reduced to any degree of strength required.

To complete the soap, I proceed as follows:

I place into an iron kettle, heated as mentioned before, one thousand (1,000) pounds of tallow. Add to it one thousand (1,000) pounds of grease, two hundred (200) pounds of palm-oil, twenty-five (25) pounds of potash, sixty-four (64) gallons of cold water, and let all boil for one (1) hour. Then I add one hundred (100) gallons of Lye No. 1, first reduced to fifteen (15) degrees of strength. Let it again boil for one (1) hour. When so, I add one hundred (100) gallons of Lye No. 2, first reduced to fifteen (15) degrees of strength. Let all again boil for one (1) hour, after which time this compound will be what I term glue-soap. Then I add common salt, in small quantities, until the lye separates from the glue-soap. Let it rest for two hours, without fire or steam, until all the lye has settled to the bottom of the kettle. When this is done, I place a pump into the kettle, and pump out all the lye collected at the bottom. Then I add one hundred (100) gallons of Lye No. 1, and one hundred (100) gallons of Lye No. 2, both first reduced to fifteen (15) degrees of strength. Let all boil for half an hour. Then I add two hundred (200) pounds of rosin. Let all boil for two hours. When so, I add common salt, in small quantities, until the lye has separated from the soap. When so, I let all stand until the lye has settled to the bottom. Then I pump all the lye out in the same manner as stated before. Then I add one hundred (100) gallons of Lye No. 1, first reduced to five (5) degrees of strength, and one hundred gallons of Lye No. 2, first reduced to ten (10) degrees of strength. Let all boil until no more foam is produced on the surface, which will take from five to eight hours, during which time I add every hour twenty-five (25) pounds of each of last-named lyes. Then I cover the kettle, and let the lye settle to the bottom. When so, I introduce a pump, as before stated, and pump all the lye out. Then will remain what I term separated soap. Now, I add, keeping all well heated, little by little, one hundred gallons of water. Let all boil for about half an hour, take out the fire, or turn off the steam, cover the kettle well, and let it remain for about eighteen (18) hours.

Now, I place into another boiler two hundred (200) pounds of cocoa-oil. Let it heat gradually to about thirty-five (35) degrees Fahrenheit. Add to it two hundred (200) pounds of Lye No. 3, twenty-five (25) degrees strong. Stir it until well combined. When so, this will be what I term cocoa-soap. This I keep warm, and introduce, under constant stirring, all of the above-named separated soap. Keep on stirring until all is well combined and looks smooth. When so, I pour this mixture, under constant stirring, into soap-frames, and keep stirring in the frames until thick. Let it stand until hard. When so, the soap is finished.

What I claim as my invention, and desire to secure by Letters Patent, is—

A new and improved process for making soap, as herein described, using for that purpose the aforesaid ingredients or compositions of matter, or any other substantially the same, and which will produce the intended effect.

JOHN L. KLEIN.

Witnesses:
   Cor. R. Disorway,
   C. Havard.